United States Patent [19]

Röck

[11] 4,338,699
[45] Jul. 13, 1982

[54] FURNITURE HINGE

[75] Inventor: Erich Röck, Höchst, Austria

[73] Assignee: Julius Blum Gesellschaft m.b.H., Höchst, Austria

[21] Appl. No.: 145,474

[22] Filed: May 1, 1980

[30] Foreign Application Priority Data

May 7, 1979 [AT] Austria .................................. 3369/79

[51] Int. Cl.³ .............................................. E05D 7/04
[52] U.S. Cl. ....................................... 16/237; 16/370
[58] Field of Search ................. 16/132, 130, 131, 129, 16/164, 237, 238, 370

[56] References Cited

U.S. PATENT DOCUMENTS

| 4,099,293 | 7/1978 | Pittasch | 16/149 |
| 4,185,357 | 1/1980 | Busse | 16/132 X |
| 4,207,652 | 6/1980 | Lautenschläger | 16/130 |

Primary Examiner—Andrew V. Kundrat
Attorney, Agent, or Firm—Wenderoth, Lind & Ponack

[57] ABSTRACT

A door hinge assembly is especially adapted to be used in cabinets or the like whose side walls cannot support the hinge arm of the hinge. The cabinet has a door frame structure to which a fastening member for the hinge arm is secured, and the fastening member extends into a recess in the corresponding structural member of the door frame structure. An adjustment device for adjusting the fastening member within the recess of the structural member are provided.

10 Claims, 10 Drawing Figures

FURNITURE HINGE

BACKGROUND OF THE INVENTION

1. Field of the Invention

The present invention relates to a furniture frame - hinge arm assembly comprising a fastening member carrying a hinge arm, the fastening member fully or partially extending into a recess of a structural member of a side of a piece of furniture.

2. DESCRIPTION OF THE PRIOR ART

So-called door frames are more and more frequently used in modern furniture construction. Such frames, which are solid structural members, carry the hinges for the furniture doors, whereas the actual side walls of the body of the piece are made of less strong material. This new kind of furniture construction gives rise to new problems when mounting the hinges for the doors, as the mounting plates of conventional hinges are too long to be fastened to the door frames. It is no longer possible to fasten the hinge to the furniture side wall, as the weak material of which the side wall is made is not able to carry the weight of the door.

SUMMARY OF THE INVENTION

It is, therefore, the object of the present invention to provide a furniture frame - hinge arm assembly by means of which the hinge arm can be fastened on a door frame, i.e. an assembly requiring very little space in the direction of the depth of the piece of furniture and allowing adjustment of the hinge arm.

According to the invention this is achieved by making the inside dimension of a recess formed, e.g. in the frame, at least in the vertical direction of the furniture side wall, greater than the width of a fastening member fitted, into the recess, whereby the fastening member is fixed to the furniture side wall or to a structural member belonging to the furniture side wall by at least one fastening screw.

This kind of assembly is preferably applied if there is only limited room in the direction of the depth of the member on the furniture side wall. It is, however, of advantage if the structural member belonging to the furniture side wall is a door frame member.

A further embodiment of the invention provides that the recess is U-shaped in the plane of the closed door.

This embodiment is particularly suitable for mounting a hinge having a hinge arm and also possibly a fastening member extending beyond the thickness of the door frame member freely into the body of the piece of furniture.

This possibility is of particular importance with hinges having an opening angle of more than 90°, particularly between 170 and 180°, as the hinge links required for such opening angles cannot be accomodated in a small space.

It is further provided that the side walls of the U-shaped recesses maybe concave. Such recesses can be drilled in a conventional manner.

A preferred embodiment further provides that the fastening member is, in the region of the recess, provided with a flange or the like arranged on at least one, preferably two sides.

Such flanges form a stop when adjusting the hinge arm.

A further embodiment of the invention provides that the recess and that part of the fastening member which is arranged therein are cylindrical, the diameter of the recess being greater than the diameter of the fastening member. It further provides that a fastening screw is arranged at the bottom or inner portion of the fastening member, such fastening screw extending through a slot in the structural member which belongs to the furniture side wall, e.g. the door frame member, and clamping the fastening member to the structural member.

In order to increase the stability of the furniture frame - hinge arm assembly, a further embodiment provides that the fastening member has two flanged projections which rest, on opposite vertical sides of the recess, against the structural member belonging to the furniture side wall. Such projections have slots that are aligned in the adjusting direction of the fastening member and through which extend fastening screws that are screwed into the structural member.

BRIEF DESCRIPTION OF THE DRAWINGS

In the following various embodiments of the invention will be described in more detail with reference to the accompanying drawings, without being limited thereto, and wherein.

DETAILED DESCRIPTION OF THE PREFERRED EMBODIMENTS

Figure 1:
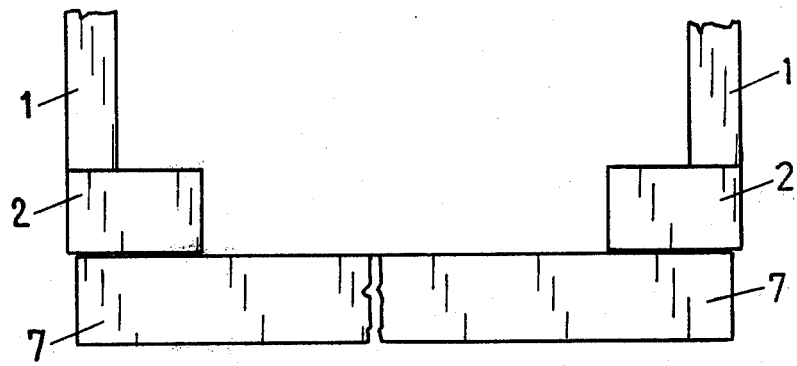
FIG. 1 is a schematic horizontal sectional view of a furniture body in which the furniture frame - hinge arm assembly of the invention can be arranged.

As shown in FIG. 1, a furniture assembly, shown only partially, includes furniture sides extending vertically and each including, e.g., a furniture side wall 1 and a door frame member 2, and a door 7, whereby at least one hinge links the door 7 to one furniture side, e.g. to the door frame member 2.

On one side of the door 7 the hinge is in a conventional manner provided with a dowel casing 8 embedded in a corresponding bore of the door 7. The dowel casing 8 is linked to a hinge arm 6 by means of hinge links 9.

Figure 6:
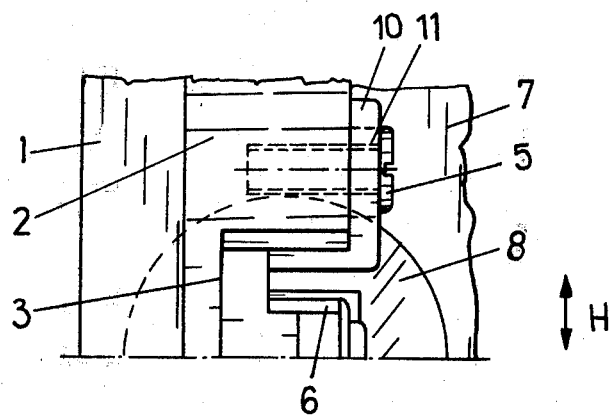
FIG. 6 is an elevation view of the hinge illustrated in FIG. 5 seen from inside the piece of furniture.
Figure 5:
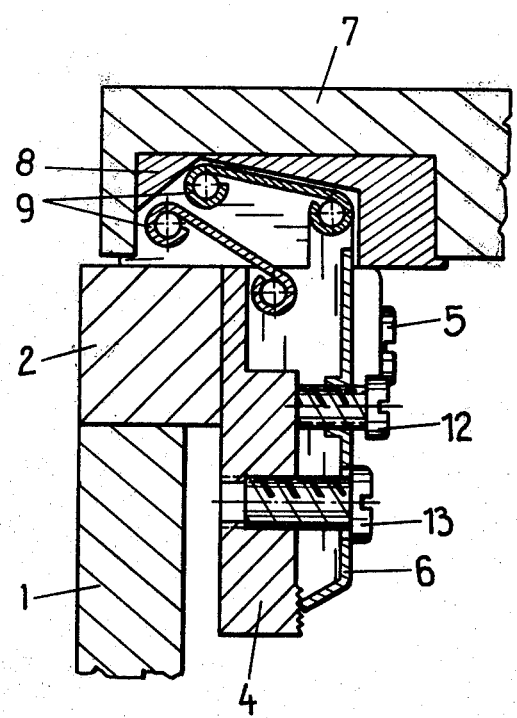
FIG. 5 is a horizontal sectional view of a hinge with a furniture frame - hinge arm assembly in accordance with the present invention.

On the respective furniture side, the hinge arm 6 is mounted on a fastening member 4, as shown in FIGS. 5 and 6. Fastening member 4 is inserted into a recess 3 formed in the furniture side, e.g. in the door frame member 2, and is attached thereto by means of fastening screws 5 extending through flanged projections 10 of the fastening member 4.

As viewed in the direction of the vertical height of the piece of furniture, the height of the recess 3 is greater than the width of the fastening member 4. The fastening screws 5 extend through slots 11 arranged in the flanged projections 10 in order to allow an unimpeded adjustment of the position of the hinge in direction of the height of the piece of furniture, i.e. in the direction of double arrow H in FIG. 6.

In the embodiment illustrated in FIGS. 5 and 6, the hinge arm 6 is in a conventional manner fixed to the fastening member 4 by means of an adjusting screw 12 and a fastening screw 13.

The above-described assembly allows adjustments of the hinge arm in the direction of the height of the piece of furniture, as well as the direction of the depth and of the door joint.

The adjustments of the door joint and in the direction of the depth of the piece of furniture are effected in a conventional manner by means of screws 12, 13, and for this reason this manner of adjustment need not be further described.

Figure 8:
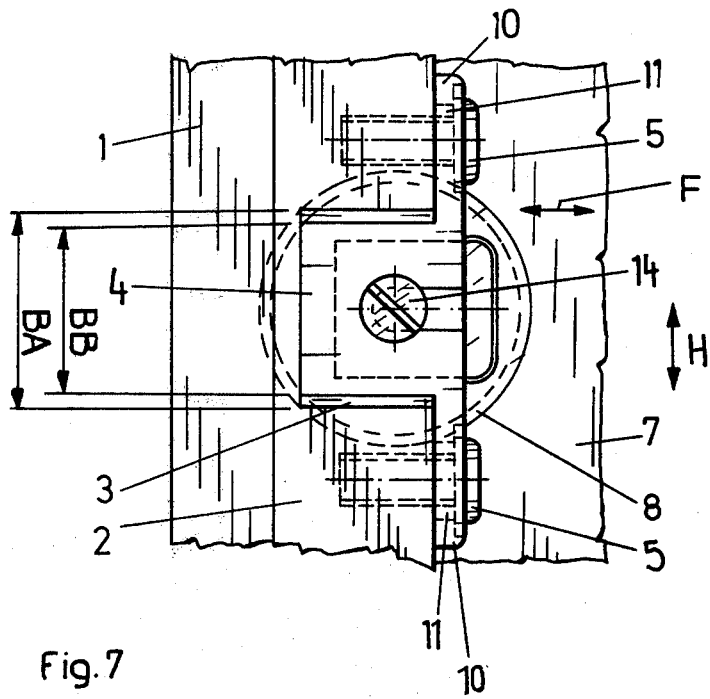
FIG. 8 is a view of hinge of FIG. 7 seen from inside the furniture body.
Figure 7:
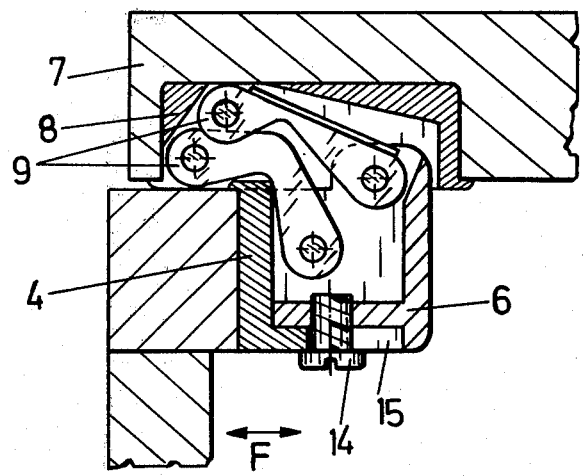
FIG. 7 is a horizontal sectional view of a further hinge.

FIGS. 7 and 8 show an embodiment in which the fastening member 4 as well as the hinge arm 6 are supported in a more compact manner, i.e. they extend inside the piece of furniture, thereby not exceeding the breadth of the door frame member.

The recess 3 in the door frame member 2 is also U-shaped, and the height BA of recess 3 is greater than the width BB of the fastening member 4.

The hinge arm 6, which is again linked to the dowel casing 8 by means of hinge links 9 extends into a recessed portion of said fastening member and is screwed to the fastening member 4 by means of a screw 14, dowel casing 8 being inserted into the door 7. The screw 14 extends through a slot 15 in a rear wall of the fastening member so that the hinge arm 6 can easily be mounted on the fastening member 4, and an adjustment in the direction of the door joint, i.e. in the direction of double arrow F of FIG. 7, is possible. As can be seen in FIGS. 7 and 8, the slot 15 is open on that side of the fastening member 4 which is directed towards the hinge arm 6. The hinge arm 6, which is of substantially U-shaped cross-section in this embodiment, fits closely into the fastening member 4 within the recessed portion thereof.

The fastening member is provided with flange projections 10 having slots 11, with fastening screws 5 extending through slots 11. This hinge also allows adjustments in the direction of the height of the piece of furniture and in the direction of the door joint.

Figure 2:
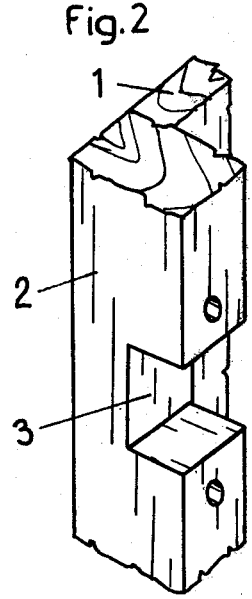
FIGS. 2 through 4 are perspective view of door frame members with various embodiments of recesses adapted to receive the fastening member of a furniture frame - hinge arm assembly in accordance with the present invention.
Figure 3:
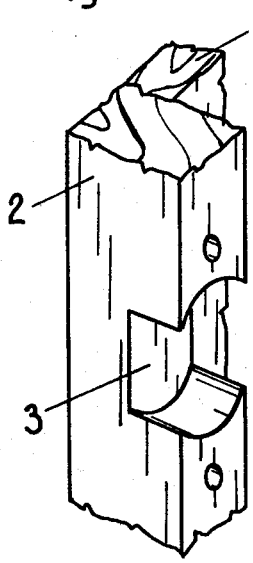
Figure 4:
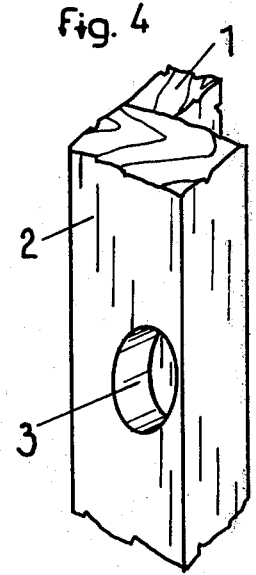

In the embodiments of FIGS. 5-8, the walls of recesses 3 are shown as being planar, per FIG. 2. However, the walls could be concave, as shown in FIG. 3, with corresponding changes in the respective walls of members 4.

Figure 10:
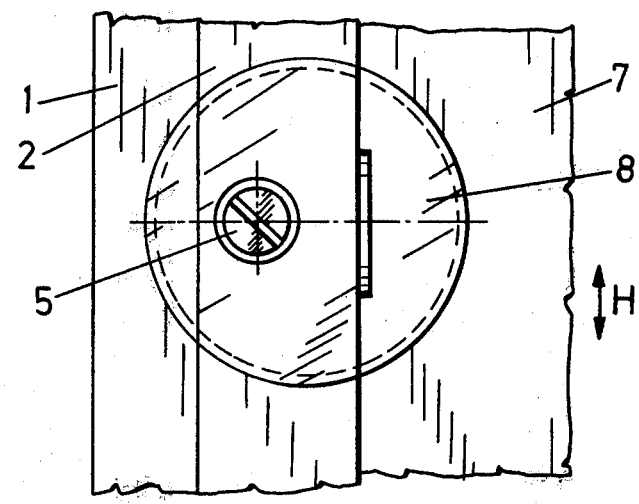
FIGS. 9 and 10 are a horizontal sectional view and an elevation view seen from inside the piece of furniture respectively, of a further embodiment of a furniture frame - hinge arm assembly.
Figure 9:
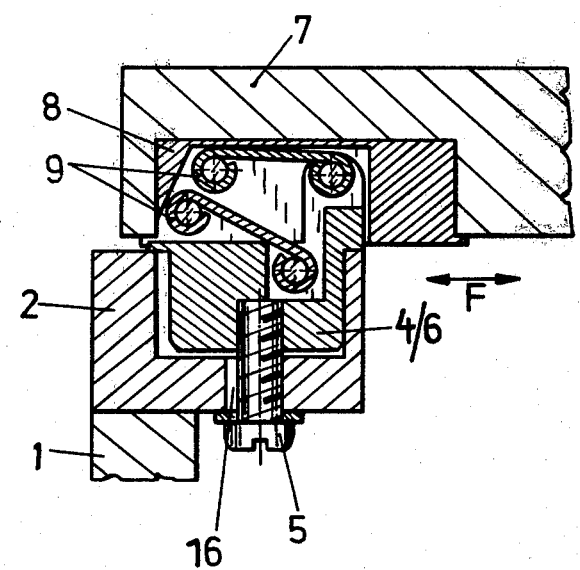

In the embodiment shown in FIGS. 9 and 10, the fastening member 4 and the hinge arm 6 are combined to form a cylindrical member 4/6. The recess 3 in the door frame member 2 is also cylindrical, the diameter of the recess 3 being greater than the diameter of the member 4/6.

A slot or opening 16 is provided in the door frame member 2, the fastening screw 5, which fixes the member 4/6 to the door frame member 2, extending through slot 16. Depending on the alignment of the screw 5 with respect to slot 16, adjustments of the hinge in the direction of the door joint (double arrow F) or in the direction of the height of the piece of furniture (double arrow H) are possible.

The member 4/6 is linked to the dowel casing by means of hinge links 9.

What is claimed is:

1. A furniture assembly comprising furniture side walls, a door frame attached to said side walls and defining an opening, a door, and a least one hinge connected to said door and mounting said door to open and close said opening, said assembly further comprising:
    a recess formed in a vertical portion of said frame;
    a fastening member fastened to said frame and having a portion extending into said recess;
    said fastening member having a rear wall having therein a generally horizontal slot open at an end thereof facing away from said frame;
    said hinge including a hinge arm;
    screw means extending through said slot and into said hinge arm for mounting said hinge arm on said fastening member, whereby the position of said hinge and said door are adjustable horizontally with respect to said frame and said fastening member; and
    the height of said recess being greater than the width in the vertical direction of said portion of said fastening member, whereby the position of said fastening member, said hinge and said door are adjustable vertically with respect to said frame.

2. An assembly as claimed in claim 1, wherein said fastening member includes a recessed portion, and said hinge arm extends into and is substantially housed within said recessed portion.

3. An assembly as claimed in claim 2, wherein said fastening member and said hinge arm are substantially housed horizontally within the width of said frame.

4. An assembly as claimed in claim 1, wherein said fastening member has a rear face substantially flush with a rear face of said frame, such that said fastening member and said hinge arm do not extend substantially behind said rear face of said frame.

5. An assembly as claimed in claim 1, wherein said recess is substantially U-shaped in a plane parallel to the plane of said door when closing said opening.

6. An assembly as claimed in claim 5, wherein the side walls of said U-shaped recess are concave.

7. An assembly as claimed in claim 5, wherein the side walls of said U-shaped recess are planar.

8. An assembly as claimed in claim 1, wherein said fastening member includes vertically aligned flanged projections extending from said portion extending into said recess, said projections being fastened to a side of said frame.

9. An assembly as claimed in claim 8, wherein said projections have therein vertically extending slots.

10. A furniture assembly comprising furniture side walls, a door frame attached to said side walls and defining an opening, a door, and at least one hinge connected to said door and mounting said door to open and close said opening, said assembly further comprising:
    a cylindrical recess formed in a front face of said frame;
    said hinge including a hinge arm having an integral cylindrical portion forming a fastening member extending into said recess;
    an opening extending from a rear face of said frame and opening into said recess;
    screw means extending through said opening and into said fastening member for mounting said hinge and said door on said frame; and
    the size of said opening being greater than the size of said screw means, and the diameter of said recess being greater than the diameter of said cyclindrical portion, whereby the position of said hinge and said door are adjustable horizontally and vertically with respect to said frame.

* * * * *